United States Patent
Deveau et al.

(10) Patent No.: US 7,641,369 B1
(45) Date of Patent: Jan. 5, 2010

(54) EMERGENCY UNDER-LIGHTING SYSTEMS FOR VEHICLES

(76) Inventors: Paul Deveau, 22 Peebles Drive, Freelton, ON (CA) L0R 1K0; Cynthia Deveau, 22 Peebles Drive, Freelton, ON (CA) L0R 1K0

( * ) Notice: Subject to any disclaimer, the term of this patent is extended or adjusted under 35 U.S.C. 154(b) by 0 days.

(21) Appl. No.: 12/352,470

(22) Filed: Jan. 12, 2009

Related U.S. Application Data

(60) Provisional application No. 61/020,418, filed on Jan. 11, 2008.

(51) Int. Cl.
*F21V 33/00* (2006.01)

(52) U.S. Cl. .................. 362/464; 362/802; 362/542; 362/487

(58) Field of Classification Search .............. 362/487, 362/464, 473, 540, 542, 543
See application file for complete search history.

(56) References Cited

U.S. PATENT DOCUMENTS

| | | | |
|---|---|---|---|
| 3,882,449 A | 5/1975 | Bouchard et al. | |
| D286,446 S | 10/1986 | Caroli et al. | |
| 4,723,078 A | 2/1988 | Neuffer et al. | |
| 5,815,073 A | 9/1998 | Gomez et al. | |
| 6,323,766 B1 | 11/2001 | Bartlett et al. | |
| 6,861,949 B2 * | 3/2005 | Carlson et al. | 340/440 |
| 6,879,251 B2 | 4/2005 | Robbins et al. | |
| 7,129,826 B2 | 10/2006 | Nitz et al. | |
| 2003/0142501 A1* | 7/2003 | Exilien | 362/464 |
| 2003/0147247 A1* | 8/2003 | Koike | 362/464 |
| 2005/0169001 A1* | 8/2005 | Farrow et al. | 362/476 |
| 2006/0002121 A1 | 1/2006 | Weitzel | |
| 2008/0291003 A1* | 11/2008 | Carpenter | 340/463 |

* cited by examiner

*Primary Examiner*—Laura Tso

(57) ABSTRACT

The present invention features an emergency lighting system for vehicles. In some embodiments, the system comprises a light pod and a microprocessor. The lights are turned on when an air bag is activated, the vehicle battery is cut off and/or the vehicle is rolled over.

7 Claims, 4 Drawing Sheets

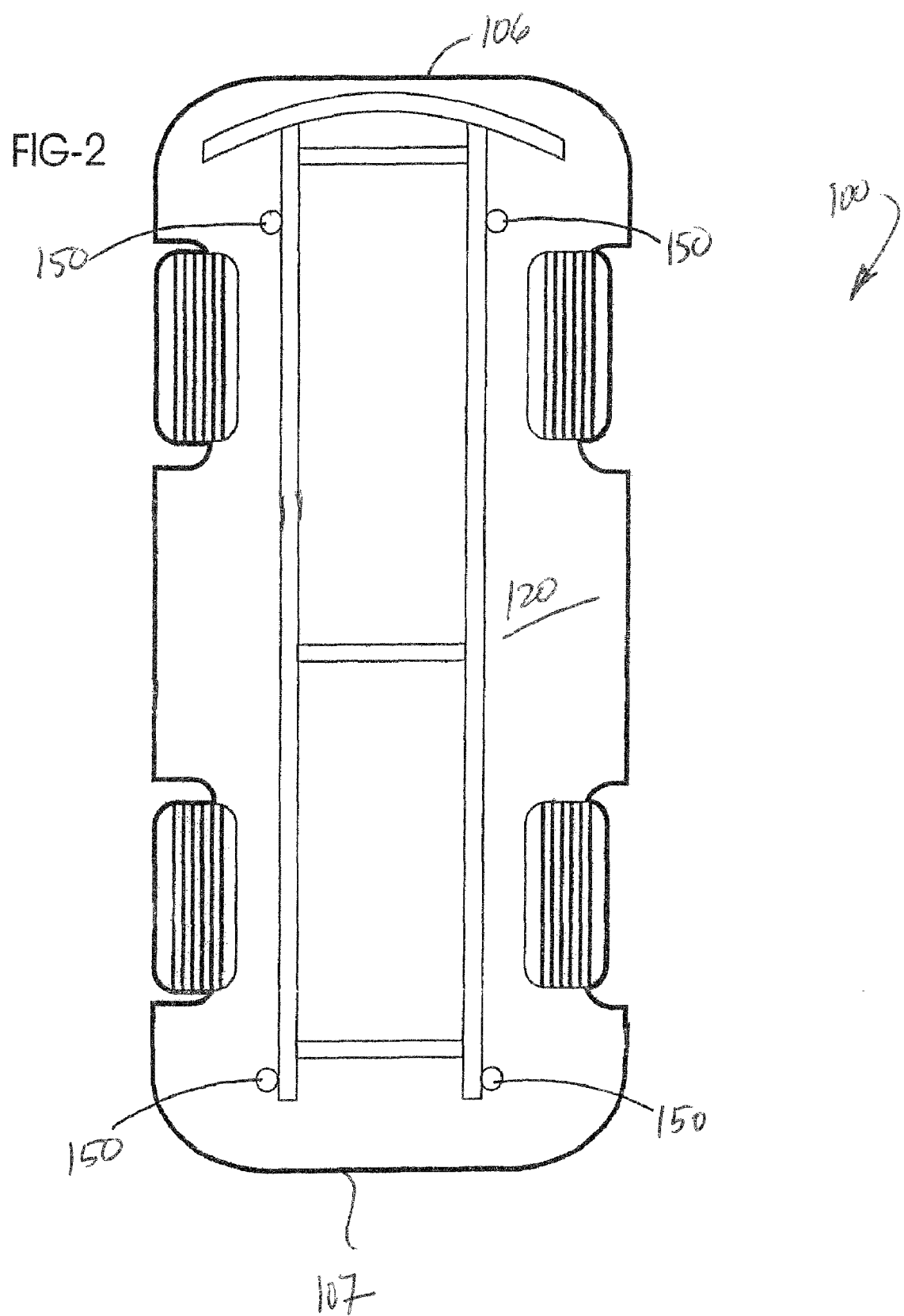

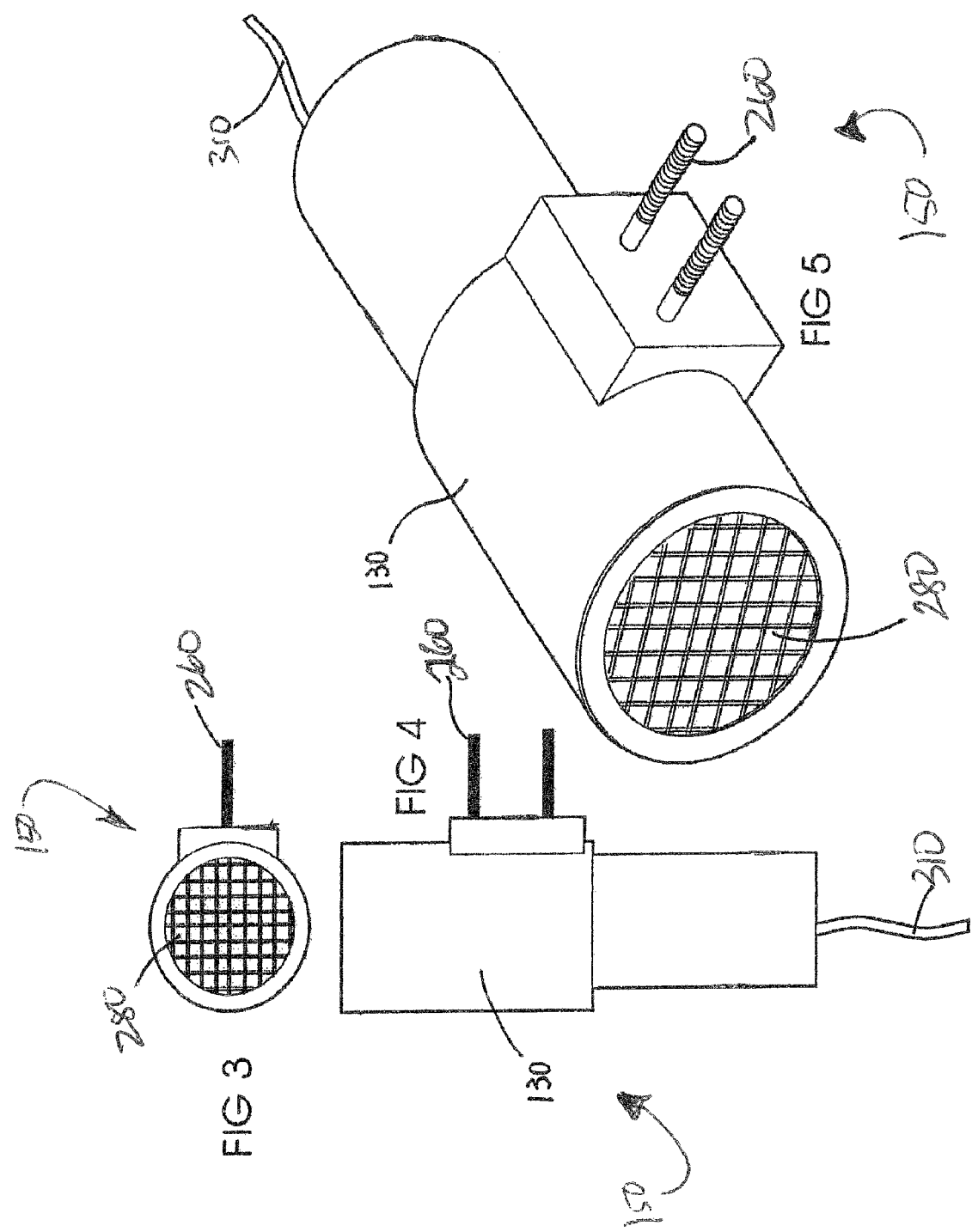

EMERGENCY UNDER-LIGHTING SYSTEMS FOR VEHICLES

The present application claims benefit to an earlier provisional patent application Ser. No. 61/020,418, filed Jan. 11, 2008, the entire disclosure of which is incorporated herein by reference.

FIELD OF THE INVENTION

The present invention is directed to a lighting system for an automobile, more particularly to a lighting system activated by a crash or other similar situation.

BACKGROUND OF THE INVENTION

Many car accidents result in rollovers. A great number of accidents occur in the dark and where there are no street lights. In those situations, it may be difficult to see the vehicles that are in distress. The present invention features a lighting system for vehicles that is activated by an accident or other similar situation. The lighting system is designed to make the vehicle very visible to others so that others can alert the police and call for medical attention.

SUMMARY OF THE INVENTION

The present invention features an emergency lighting system 100 for attaching to the underside of a vehicle. In some embodiments, the system 100 comprises a set of light pods 150, wherein each light pod 150 has a battery (e.g. a watch batter) to provide power to its light bulb, and each light pod also has an attachment means for attaching the light pod to the underside of the vehicle. For example, as shown in FIG. 3, the attachment means include a screw 260 attached to the light pod, and where the screw 260 is secured to the bottom of a vehicle, for example on the underside of the chassis 120.

The lighting system further has a microprocessor 400. The microprocessor 400 is configured to receive input signal 500 from an activator, and also to generate an output signal 510 to the light pod 150 to turn on when the microprocessor 400 receives an input 500 from the activator.

In some embodiments, the activator sends an input signal 500 to the microprocessor 400 when it is activated. In some embodiments, the activator is a manual switch 410 that can be turned on to send an input signal 500 to the microprocessor 400. The manual switch may be conveniently positioned inside the vehicle, for example on the dash board.

In some embodiments, the activator is an air bag release sensor 420 for detecting a release of an airbag, where upon detecting of a release of an airbag the air bag sensor 400 sends an input signal 500 to the microprocessor 400. Any air bag release sensor device may be used in accordance with the present invention, and many are known to one of ordinary skill in the art.

In some embodiments, the activator is a car battery sensor 430 for detecting a lack of battery output from the battery, where upon detecting a lack of battery output from the battery the battery sensor 430 sends an input 500 to the microprocessor 400. Any car battery sensor device may be used in accordance with the present invention, and many are known to one of ordinary skill in the art.

In some embodiments, the activator is a gyroscope 440 for detecting that the vehicle is not in an upright position, where upon detecting that the vehicle is not in an upright position the gyroscope 440 sends an input signal 500 to the microprocessor 400. Any gyroscope device may be used in accordance with the present invention, and many are known to one of ordinary skill in the art. In some embodiments, the gyroscope 440 sends an input signal 500 to the microprocessor when the gyroscope detects that the vehicle is on its side (e.g., 45 degrees to 90 degrees relative to the earth). In some embodiments, the gyroscope 440 sends an input signal 500 to the microprocessor when the gyroscope detects that the vehicle is upside down (e.g., more than 90 degrees to 180 degrees relative to the earth).

The system of the present invention may be deployed on the underside of an automobile, a motorcycle, a ski mobile, a tractor, or a trailer.

In some embodiments, the light pod of the present invention comprises a light emitting diode ("LED") light bulb.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 2 shows the light pods being attached to the underside of a car's chassis.

FIG. 3 shows a front end of a light pod.

FIG. 4 shows a side view of a light pod.

FIG. 5 shows a perspective view of a light pod.

DESCRIPTION OF PREFERRED EMBODIMENTS

Figure 1:
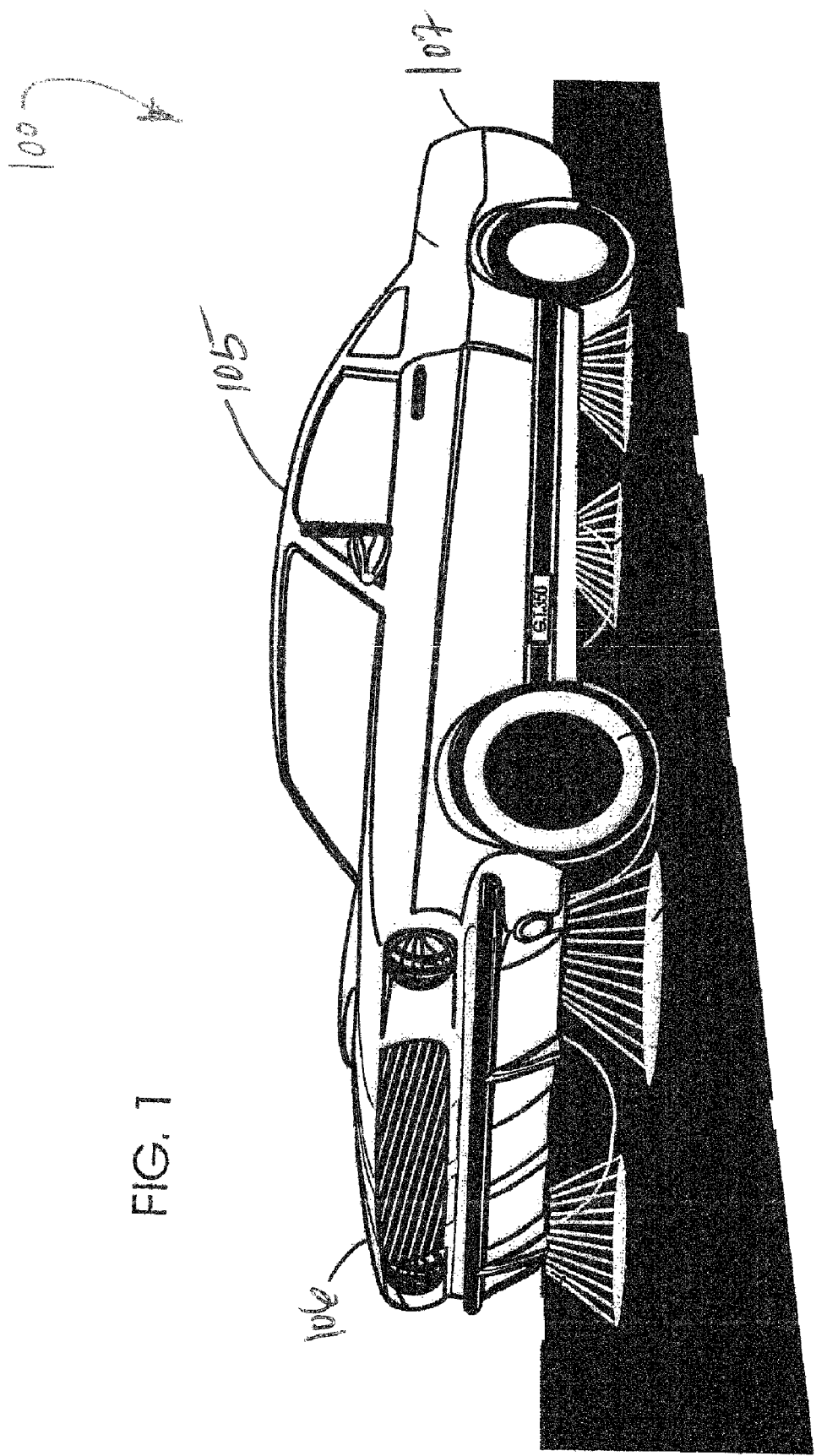
FIG. 1 shows an activated emergency lighting system deployed underneath a car.
Figure 6:
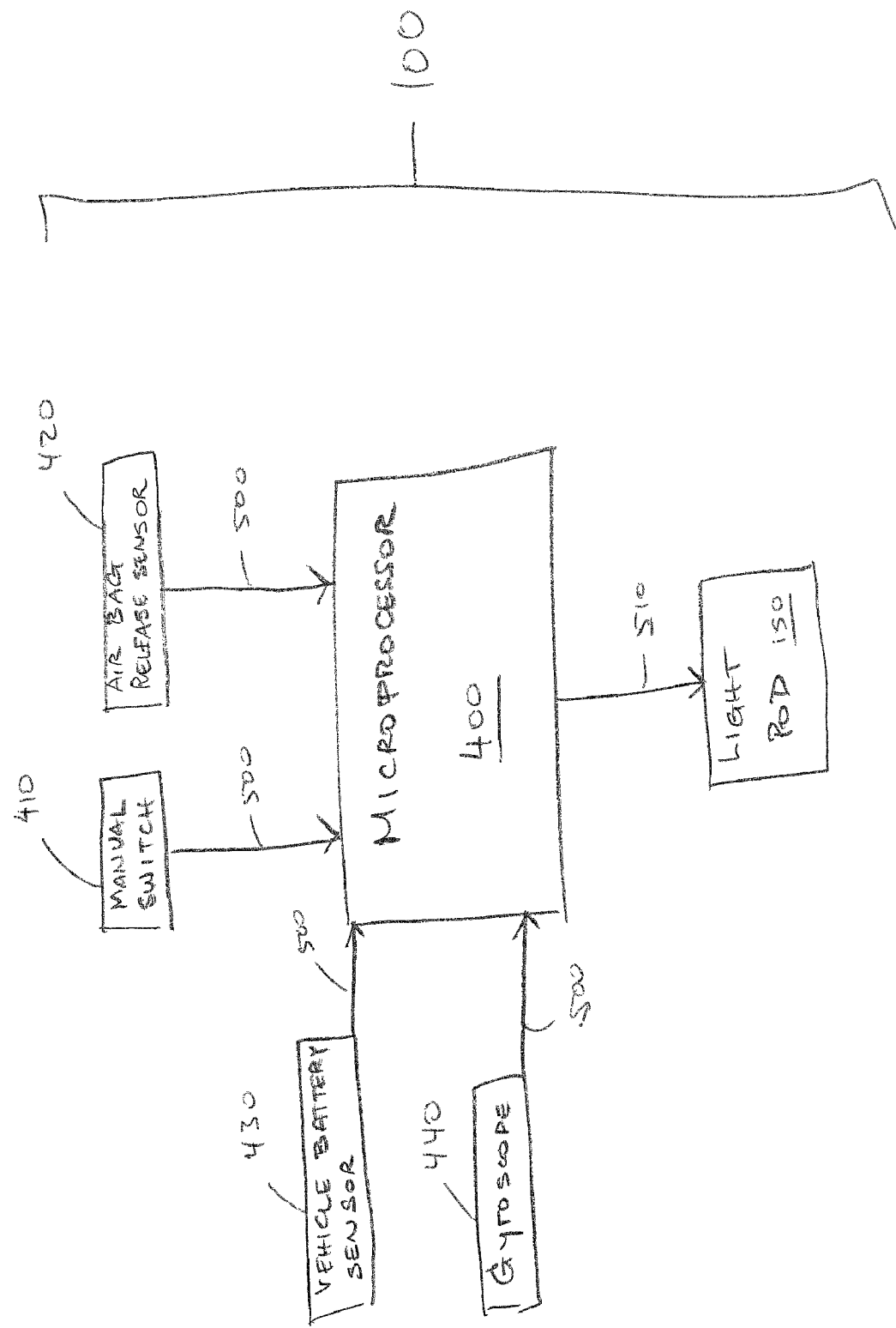
FIG. 6 shows a schematic of the emergency lighting system.

The following is a listing of numbers corresponding to a particular element refer to herein:

100 lighting system
105 vehicle
106 front of vehicle
107 back of vehicle
120 underside of chassis
130 housing of light
150 light
260 attachment means
280 protective lens for light
310 wire The present invention features a lighting system for use in an automobile, wherein the lighting system can be activated by a crash or other similar situation. The lighting system of the present invention is designed to draw a great deal of attention to a vehicle if the vehicle has been in an accident. The lighting system is activated automatically in a rollover, collision, battery malfunction, or other similar situation. The lighting system can also be manually activated by a user if necessary.

The lighting system comprises a plurality of lights, for example four lights. The lights are mounted to the bottom of a chassis of an automobile. In some embodiments, two lights are mounted near the front of the automobile and two lights are mounted near the back of the automobile. The lights can cast a light beam to alert others of the presence of the vehicle in distress.

The lights may be attached to the vehicle via an attachment means (e.g., a screw, bolts, the like). In some embodiments, the lights are encased in a waterproof housing.

The lights are electrically connected to a power source. In some embodiments, the power source includes the battery of the vehicle. In some embodiments, the power source includes separate batteries. The lighting system further comprises one or more wires for electrically connecting the battery to the lights. In some embodiments, control wires allow a user to manually activate the lighting system.

In some embodiments, the lighting system of the present invention is operable via a control switch.

The lights are electrically/operatively connected to a sensor device. The sensor device is responsible for detecting an accident or other similar situation, and then activating the lights. For example, when air bags are deployed in the vehicle, when the battery is disconnected, or when the vehicle rolls over, the sensor activates the lights of the lighting system. If the automobile has rolled over, the lights shine brightly above the vehicle so as to alert others of the vehicle.

In some embodiments, the lights are light emitting diodes (LEDs) covered with a protective lens.

The following the disclosures of the following U.S. Patents are incorporated in their entirety by reference herein: U.S. Pat. No. 4,723,078; U.S. Pat. No. 3,882,449; U.S. Pat. No. 5,815,073; U.S. Pat. No. 6,323,766; U.S. Pat. No. 7,129,826; U.S. Pat. No. 6,879,251; U.S. Pat. Application No. 2006/0002121.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An emergency lighting system for attaching to the underside of a vehicle, the system comprising:
   (a) a set of light pods, each light pod having a battery, and each light pod having an attachment means for attaching the light pod to the underside of the vehicle;
   (b) a microprocessor configured to:
      (i) receive input signal from an activator,
      (ii) generate an output signal to the pod light to turn on when the microprocessor receives an input from the activator;
   the activator sends an input signal to the microprocessor when it is activated, the activator is one or more of the following component:
      (i) a manual switch that can be turned on to send an input signal to the microprocessor;
      (ii) an air bag release sensor for detecting a release of an airbag, where upon detecting of a release of an airbag the air bag sensor sends an input signal to the microprocessor;
      (iii) a vehicle battery sensor for detecting a lack of battery output from the battery, where upon detecting a lack of battery output from the battery the battery sensor sends an input to the microprocessor; and
      (iv) a gyroscope for detecting that the vehicle is not in an upright position, where upon detecting that the vehicle is not in an upright position the gyroscope sends an input signal to the microprocessor.

2. The system of claim 1 wherein the vehicle is an automobile.

3. The system of claim 1 wherein the vehicle is a motorcycle.

4. The system of claim 1 wherein the vehicle is a ski mobile.

5. The system of claim 1 wherein the vehicle is a tractor.

6. The system of claim 1 wherein the vehicle is a trailer.

7. The system of claim 1 wherein the light pod comprises a light emitting diode ("LED") light bulb.

* * * * *